United States Patent [19]

Dines

[11] 4,383,980
[45] May 17, 1983

[54] PROCESS FOR EXTRACTING TUNGSTEN AND MOLYBDENUM VALUES FROM SOLUTION

[75] Inventor: Martin B. Dines, Santa Ana, Calif.

[73] Assignee: Occidental Research Corporation, Irvine, Calif.

[21] Appl. No.: 214,811

[22] Filed: Dec. 9, 1980

[51] Int. Cl.$^3$ .................... C01G 39/00; C01G 41/00
[52] U.S. Cl. ..................... 423/54; 423/DIG. 14; 423/658.5; 75/101 BE; 210/684
[58] Field of Search ............. 423/54, DIG. 14, 658.5; 75/101 BE; 210/684

[56] References Cited

U.S. PATENT DOCUMENTS

| 3,332,737 | 7/1967 | Kraus ................................... 423/24 |
| 3,804,945 | 4/1974 | Scott et al. ........................... 423/22 |

FOREIGN PATENT DOCUMENTS

| 586482 | 11/1959 | Canada ................................ 423/54 |
| 55-13153 | 1/1980 | Japan .................................. 423/54 |

OTHER PUBLICATIONS

Meloni et al., "Chemical Absts.", vol. 70, 1969, #120757u.

Amphlett, "Inorganic Ion Exchangers", Elseuier Pub. Co., N.Y., 1964, pp. 84–88, 113.
Moulik et al., Jour. Indians Chem. Soc.", vol. 47, 1970, pp. 149–153.

Primary Examiner—Herbert T. Carter
Attorney, Agent, or Firm—Robert J. Baran

[57] ABSTRACT

The instant invention relates to a process for removing tungsten, and/or molybdenum generally, as the tungstate and/or the molybdate anion, from aqueous solutions, e.g. brines by contacting such solutions with a high-surface area oxide selected from the group consisting of manganese and iron oxides, preferably manganese or iron hydrous oxide, whereby tungsten or molybdenum is adsorbed on said high-surface area oxide. The instant process provides selectivity for tungsten as well as molybdenum even though they are present in solutions containing various other materials such as sodium, potassium, calcium, etc. ions. This process is preferably applicable to removal of tungsten from high pH brines such as a brine having a pH of at least 9, for example greater than 10. The oxide adsorbent may be regenerated by contacting with an aqueous solution having a pH higher than the brine from which the tungsten and/or the molybdenum has been removed.

12 Claims, 1 Drawing Figure

PROCESS FOR EXTRACTING TUNGSTEN AND MOLYBDENUM VALUES FROM SOLUTION

FIELD OF THE INVENTION

The instant invention relates to a process for removing tungsten, and/or molybdenum generally, as the tungstate and/or the molybdate anion, from aqueous solutions, e.g. brines by contacting such solutions with a high-surface area oxide selected from the group consisting of manganese and iron oxides, preferably manganese or iron hydrous oxide, whereby tungsten or molybdenum is adsorbed on said high-surface area oxide. The instant process provides selectivity for tungsten as well as molybdenum even though they are present in solutions containing various other materials such as sodium, potassium, calcium, etc. ions. The process is preferably applicable to removal of tungsten from high pH brines such as a brine having a pH of at least 9, for example greater than 10. The oxide adsorbent may be regenerated by contacting with an aqueous solution having a pH higher than the brine from which the tungsten and/or the molybdenum has been removed.

CROSS REFERENCE TO RELATED APPLICATIONS

This application is related to U.S. Ser. No. 214,810 and 214,812 both entitled "A Process for Extracting Tungsten and/or Molybdenum from Solution", respectively, filed on the same date herewith in the name of David Blumer. Such related applications cover the method and making and use of a preferred novel hydrous oxide of iron to extract tungsten and/or molybdenum from solution, and the preferred methods for recovering such extracted tungsten and/or molybdenum. The disclosures of both of such related patent applications are hereby incorporated by reference in their entirety.

BACKGROUND OF THE PRIOR ART

The use of hydrous oxide ion exchangers, including both anion and cation exchangers, as adsorbents for separating inorganic ions from solution is disclosed in U.S. Pat. Nos. 3,332,737 and 3,382,034. The patentee points out certain advantages of the materials disclosed and claimed over the prior art adsorbents or ion exchangers etc. Such advantages include improved stability to acids, bases, oxidizing and reducing agents, temperature, and radiation from radioactive ions. The patentee further points out that ferric oxide has been used as an inorganic adsorbent. However, it is noted that ferric oxide is in a class of inorganic adsorbents having low ion capacity and/or low selectivity. In the U.S. Pat. No. 3,382,034 patent it is disclosed that Group VI hydrous oxide ion exchangers may be used to remove anions such as chromium, molybdenum and tungsten. Although ferric oxide is mentioned in both of these patents, as an adsorbent, there is no teaching that ferric oxide may be used to remove the chromium, molybdenum or tungsten anions noted above.

U.S. Pat. No. 3,476,553 discloses a process for recovering metals from metal-containing solutions by precipitating the metals as insoluble metal hydroxide floccules or insoluble basic salts or hydroxides. The metal-containing, insoluble hydroxides or salts are subsequently collected by contacting with a surface-active collector that is ionically charged. The surface-active collector is adsorbed at the surface of the metal-containing, insoluble hydroxide or salts to form a complex and the complex is removed by bubbling gas throughout the solution to buoy the complex and allow it to rise to the surface.

U.S. Pat. No. 3,804,945 discloses the use of gels for extracting metal values from solution by passing the solution through a column of dehydrated gel. Although ferric oxide is disclosed as a suitable gel, there is no disclosure that it can be used to remove tungsten from solution.

U.S. Pat. No. 3,931,007 discloses the treating of waste waters with iron compounds such as $\alpha$-FeOOH, $\gamma$-FeOOH, and $Fe_3O_4$ to remove dissolved heavy metals. This reference does not teach the extraction of tungsten or molybdenum and in addition, the iron compounds are formed in situ.

Processes for separating tungsten and molybdenum values from solution are known in the art. For example, U.S. Pat. No. 1,292,559 (to Andersen) discloses a process of separating tungsten compounds from e.g. "an alkaline solution of tungstic acid." In the process, ferric sulfate may be added to complex with the tungstic ions. The U.S. Pat. No. 2,962,349 (to Anglin) discloses a method of recovering tungstates from dilute solutions thereof by precipitation with, for example, a water soluble salt of iron. U.S. Pat. No. 3,510,273 (to Fitzhugh etal) discloses a method for the recovery of molybdenum from aqueous solutions thereof by the addition of metallic iron. U.S. Pat. No. 3,758,665 (to Vojkovic) discloses a method of recovery of metals including tungsten and molybdenum from aqueous solutions thereof by precipitation with a ferric salt. None of these patents, however, make any direct reference to the use of iron or manganese oxides, nor hydrous oxides as an inorganic adsorbent for the recovery of such tungsten or molybdenum values.

BRIEF SUMMARY OF THE INSTANT INVENTION

The instant invention relates to a process for removing tungsten and/or molybdenum from an aqueous solution by contacting such solution with an adsorbent comprising a high-surface area oxide selected from the group consisting of manganese and iron oxide, preferably iron oxide. The tungsten and the molybdenum are preferably in the form of the tungstate or the molybdate anion and are removed by adsorption at the surface of the insoluble high-surface area oxide. To recover the tungsten and/or the molybdenum from such high-surface area oxide an extraction solvent is contacted with the adsorbent to remove the tungsten and/or molybdenum therefrom. Such extraction solvent may be an aqueous solution having a pH greater than pH of the tungsten or molybdenum containing solution from which the tungsten or molybdenum is adsorbed. Preferably the adsorbent is a hydrous oxide of iron or manganese; more preferably of iron.

DETAILED DESCRIPTION OF THE INVENTION

Figure 1:
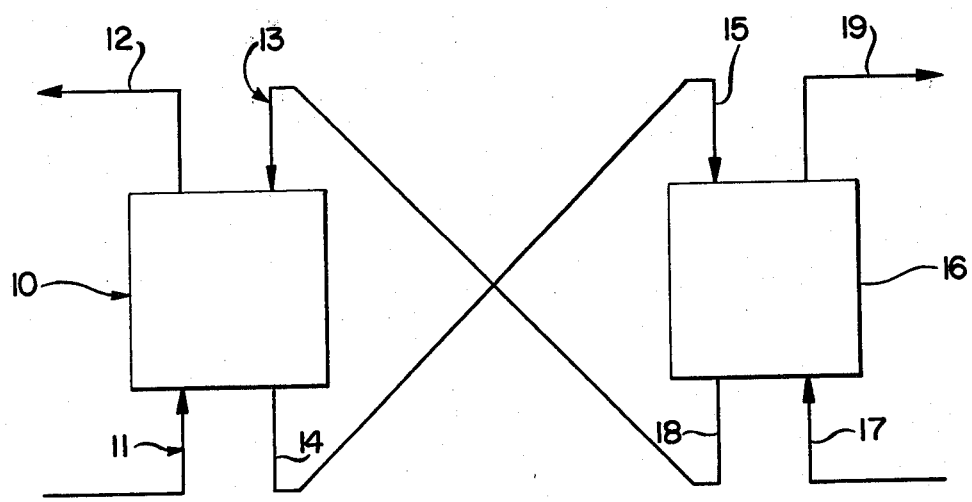

The instant invention relates to the process for the removal of tungsten or molybdenum from an aqueous solution containing their salts by contacting such solution with the high-surface area oxide selected from the group consisting of high-surface area oxides of iron and manganese, especially the hydrous oxides of iron and manganese. The invention is especially suited for removing tungsten from solutions containing low concentrations of tungsten in the presence of higher concentrations of buffering anions, such as carbonate, sulfate, halide, borate, etc. It is known in the art that in solutions of this sort it is difficult to selectively remove the tungsten and/or molybdenum. The instant process is especially suitable for the removal of tungsten from brine solutions. In the instant process the tungsten is generally in solution as the tungstate ion and molybdenum is in solution as the molybdate ion.

The pH of solutions containing such high concentrations of buffering anions is also fairly high, i.e. pH's of at least 8, more likely 9, are frequently encountered in such solutions. Examples of such solutions include brines, such as the Trona brines, found in various dry lakes in California. It is appreciated by those familiar with such brines, that an efficient process for the removal of tungstate, or molybdate, from such brines, would be very desirable.

It has been discovered that high-surface area iron oxides or manganese oxides especially the hydrous oxides of iron and manganese are suitable adsorbents for removing tungstate or molybdate from such brines.

The preferred adsorbent is an iron compound such as those represented by the general formula:

FeO(OH)

Examples of such most preferred hydrous oxides of iron include $\alpha$-FeOOH, $\gamma$-FeOOH, etc. Iron oxides such as $Fe_2O_3$ and $Fe_3O_4$ may be used in the instant process but are not as efficient and therefore are less preferred than the above hydrous oxides of iron.

$\gamma$-FeOOH (lepidocrocite) is the most preferred inorganic adsorbent for use in the instant process.

The following disclosure will use the preferred hydrous oxide adsorbents for illustration. However, it will, in general, be applicable also to the other oxides of iron and manganese adsorbents described and claimed herein.

It is found that the surface area of the hydrous oxides utilized in the instant process is important in relationship to the capacity of such hydrous oxides for molybdate or tungstate. In general, the hydrous oxides disclosed herein will have a surface area as measured by the BET method of from about 80 to about 500($m^2$/gm).

The preferred hydrous oxides used as the adsorbent in this process may be in the form of spheres or a flocculated mass. Conveniently, such oxide may be prepared by precipitating a hydrous oxide specie from solution by contacting a solution of a soluble salt precursor of such hydrous oxides with the hydroxide ion. For example, a ferric chloride solution may be neutralized with ammonium hydroxide to precipitate a hydrous ferric oxide flocculated mass. Lepidocrocite, the most preferred hydrous oxide for use in the instant process, may be synthesized in a highly pure form by the method disclosed in Example 1 below.

The high-surface area hydrous-oxide may be separated from solution and dried after precipitation to obtain an easily handled material. Conveniently, the precipitated mass may be dried at temperatures from about 25° C. to about 200° C., more preferably from about 100° C. to about 150° C. for a time of from 5 minutes to about 100 hours, more preferably from about 1 to about 5 hours, to remove excess solvent, e.g., water therefrom.

The dried hydrous oxide may be contacted with the solution from which it is desired to absorb the tungsten or molybdenum metal values as either a fixed bed column or as a slurry. An aqueous solution containing tungsten or molybdenum is contacted with the dried hydrous oxide, in either the fixed bed or slurry mode, for a time sufficient to substantially deplete such solution of its tungsten or molybdenum values. In general, the pH of the solution will be maintained at at least about 6, since the high-surface area hydrous oxides are unstable at pH's much less than about 4. Since this invention is most suited for carrying out the recovery of tungsten or molybdenum from high pH brines, this limitation is usually not important.

As noted above, the capacity of the high-surface area hydrous oxides disclosed herein is related to the surface area. However, in general, the above described hydrous oxide will have a capacity from about 0.1 to about 100, preferably, from about 1 to about 25 milligrams of tungsten per gram of hydrous oxide and a substantially equivalent capacity for molybdenum. The contacting of the molybdenum or tungsten containing solution with the hydrous oxide will take place at ambient temperature and pressure conditions. However, temperatures of from the freezing point up to the boiling point of such molybdenum or tungsten containing solutions may be utilized. For the sake of economy, the solution will be contacted with the hydrous oxide at the temperature at which such solution is available, i.e. ambient.

Contacting may take place for from about 1 to about 1000 minutes, preferably from about 1 to about 60 minutes, and generally until a substantial portion of the capacity of the high-surface area hydrous oxide is utilized.

In the slurry procedure described below, the aqueous solution, depleted in tungsten and/or molybdenum may be separated from the hydrous oxide adsorbent containing adsorbed molybdenum or tungsten, and such hydrous oxide may then be contacted with an extraction solution to strip the tungsten or molybdenum therefrom. In general, a higher pH solution is utilized to remove the tungsten or molybdenum values from the adsorbent, i.e. the pH of the extracting solution should be greater than the pH of the solution from which the tungsten or molybdenum was originally adsorbed. A suitable pH for such extracting solution would be at least about 10, preferably at least about 12. A typical extraction solution may comprise from about 20 to about 50 grams NaOH per liter.

When operating the instant process in the "fixed bed" mode, a flow of a higher pH aqueous liquid is passed through the column including the tungsten or molybdenum containing hydrous oxide to elute the adsorbed metal values therefrom.

Thus, the present invention also provides a process for concentrating a dilute salt solution of molybdenum or tungsten, i.e. the extracting solution may have a much lesser volume than the solution from which the tungsten and molybdenum is originally adsorbed. Concentrations of at least about 20 gms/liter may thus be obtained by the process of the instant invention from brine solutions containing from 20 to about 50 mg per liter of tungsten and/or molybdenum.

The process of the instant invention may also provide for the separation of tungsten and molybdenum selectively from aqueous solutions containing other interfering ions. For example, the ions such as halides, sulfate, carbonate, bicarbonate, etc., which are present in brine will not be selectively adsorbed and therefore the process will not suffer from the presence thereof.

The instant invention may be more conveniently described by reference to FIG. 1 which defines a flow scheme for the separation of tungsten, as the tungstate ion, from a Trona brine by adsorption on lepidocrocite, recovery of such tungstate, and regeneration of the lepidocrocite adsorbent. This flow scheme will also be applicable to the separation of molybdate as well, and the adsorbent may be any of the other hydrous oxides or oxides of iron and manganese described herein. Furthermore, solutions other than a Trona brine are suitable for treatment by the process of the instant invention to recover molybdenum and tungsten values.

A Trona brine which comprises about 20 to about 70 mg/liter of tungsten as the tungstate ion and various ions such as sodium, potassium, chloride, bicarbonate, carbonate, borate, etc. at a pH of 9.6 is passed through inlet 11 into complexer 10 at a rate of 5 gallons/minute. Such brine is contacted in complexer 10 with a slurry of lepidocrocite in water which is introduced into said complexer 10 through inlet 13. The slurry comprises about 10 to about 15 weight percent lepidocrocite in water and is passed into said complexer 10 at a rate of 5 gallons/minute. The residence time of said brine in said comlexer is about 10 minutes and upon existing therefrom through outlet 12 will be substantially depleted in tungstate. For example, the outlet solution will comprise less than about 1 mg/liter tungsten. The contacting takes place at ambient temperature and pressure conditions, the brine being at a temperature of about 50° C. upon passage through inlet 11 and about 50° C. upon exit through outlet 12. The slurry, which is loaded with tungstate, passes through outlet 14 which is in fluid communication with stripper 16 by means of stripper inlet 15. Prior to entrance into stripper 16 the slurry will contain 10 mg of tungsten per gram of lepidocrocite. A caustic solution having a pH of at least about 14 is passed into stripper 16 by means of inlet 17. The solution may be conveniently comprised of sodium or potassium hydroxide or other alkaline or alkaline earth metal base. Both the slurry, including tungsten adsorbed on lepidocrocite and the caustic solution are passed into the stripper at a rate of about 5 gallons/minute. The tungsten loaded lepidocrocite is contacted with such caustic solution and exits through stripper exit 18 which is in fluid communication with complexer inlet 13. The caustic solution containing about 0.5–1.0 g/liter of tungsten exits stripper exit 19. In the process it can be seen that a brine containing about 20 to about 70 mg/liter of tungsten is converted into a solution comprising about 0.5–1.0 g/liter by means of the process of the instant invention. Furthermore, recovered tungsten solution is substantially depleted in the anions and cations found in the original brine. Lepidocrocite is continuously cycled between the complexer and stripper for use in extracting tungsten from such brine. The tungsten may be recovered from the caustic solution exiting 19 by means of the processes disclosed in the above referenced related patent applications.

The following are working examples of the instant invention, however, there is no intention that the claims appended hereto by construed as limited to such working examples.

EXAMPLE 1

Preparation of Lepidocrocite

One hundred and twenty grams of $FeCl_2.4H_2O$ was dissolved in three liters of water and mixed with a solution of hexamethylenetetra amine solution comprising 160 grams of the amine and 600 ml. of water. The resulting mixture yielded a blue-green precipitate of ferrous hydroxide. A solution of 42 grams of sodium nitrate and 600 ml. of water was added with stirring and heating to 60° C. After heating, the solution was allowed to sit for three hours while nitric oxide evolved and the precipitate turned orange. The orange precipitate was filtered from the solution and washed with two liters of water. It was dried for 24 hours at 60° C. and then for an additional 72 hours at 40° C. The dried sample was analyzed and found to be lepidocrocite at a high purity.

EXAMPLE 2

One gram of $NaWO_4.2H_2O$ was dissolved in 100 milliliters of water and enough sodium carbonate was added to bring the pH of the solution to 10. Ten milliliters of this solution was mixed with 2 grams of the sample of lepidocrocite prepared in Example 1 and left to stand for 1 day. Lepidocrocite was separated from the solution and the solution analyzed for tungsten. It was found that 21% of the tungsten remained indicating that 79% of the original tungsten was adsorbed on lepidocrocite.

EXAMPLE 3

The lepidocrocite of Example 2 containing 2.9% by weight adsorbed tungsten is slurried with a sodium hydroxide solution containing 4%, by weight, sodium hydroxide and having a pH of 14. After separating the caustic treated solution, it is found that all of the tungstate was dissolved therein.

EXAMPLE 4

Fifteen grams of lepidocrocite as prepared in Example 1 was loaded into a column having the dimensions 1" wide by 12" in length. A synthetic brine having a pH of 9.5, 45 ppm tungstate, and chloride, sulfate, carbonate and borate ions was run through such column at a rate of 1 cc per minute. The tungstate level in the effluent dropped from the original 45 ppm to an immeasurable level, i.e. less than 0.3 ppm in the first few fractions collected. The effluent stayed below 1 ppm tungstate until loading on the column exceeded about 10 mg per gram or 0.04 meg. tungstate per gram. At this point, the flow of brine was stopped and the lepidocrocite was washed with ionized water. After such washing, the column was stripped with 160 milliliters of 1 normal sodium hydroxide. Approximately 75% of the adsorbed tungstate was recovered in the 1 normal sodium hydroxide solution.

What is claimed is:

1. A process for extracting a dissolved metal ion selected from the group consisting of tungstate and molybdate from a solution which comprises contacting said solution having pH of at least about 6 with an inorganic oxide adsorbent selected from the group consisting of iron and manganese oxides, and adsorbing said metal ion on said inorganic oxide adsorbent.

2. The process of claim 1 wherein such oxide comprises a hydrous oxide.

3. The process of claim 2 wherein said solution is an aqueous solution.

4. The process of claim 2 wherein said hydrous oxide comprises an iron hydrous oxide.

5. The process of claim 2 wherein said hydrous oxide has the formula

FeO(OH)

6. The process of claim 5 wherein said solution contains, in addition to tungstate and molybdate, interfering anions selected from the group consisting of halide, sulfate, borate, carbonate, bicarbonate ions and mixtures thereof.

7. The process of claim 6 wherein said hydrous oxide comprises lepidocrocite.

8. The process of claim 7 wherein said adsorbed tungstate and/or molybdate is recovered from said lepidocrocite by contacting said lepidocrocite with a basic aqueous solution having a pH greater than about 10.

9. The process of claim 8 wherein tungsten is recovered from said lepidocrocite by contacting said lepidocrocite with a basic aqueous solution containing from about 20 to about 50 grams of sodium hydroxide per liter.

10. The process of claim 6 wherein said solution contains from about 20 to about 50 mg/liter tungsten.

11. The process of claim 1 wherein said dissolved metal is tungsten.

12. A process for extracting a metal ion, selected from the group consisting of molybdate and tungstate ions, from a first solution having a pH of at least about 6 which comprises:
(a) passing said first solution into an extraction zone in a counter-current flow with a hydrous metal oxide selected from the group consisting of iron or manganese hydrous oxides,
(b) adsorbing said metal ion on said hydrous metal oxide,
(c) removing said hydrous metal oxide from said extraction zone along with said adsorbed metal ion,
(d) passing said removed hydrous metal oxide into a stripping zone in counter-current flow with a second solution having a pH greater than said first solution,
(e) removing from said extraction zone, said first solution depleted in metal ion,
(f) removing from said stripping zone a hydrous metal oxide having a reduced amount of adsorbed metal ion, and
(g) passing said hydrous metal oxide having a reduced amount of adsorbed metal ion back to said extraction zone.

* * * * *